United States Patent Office 2,724,704
Patented Nov. 22, 1955

2,724,704

ALKYD-SILICONE COATING COMPOSITIONS AND PROCESSES THEREFOR

Ronald L. Millar, Chicago, Ill., assignor to The Glidden Company, Cleveland, Ohio, a corporation of Ohio No Drawing. Application November 9, 1951,
Serial No. 255,729

11 Claims. (Cl. 260—22)

This invention relates to processes for preparing novel vehicles for coating compositions, and to novel coating compositions containing said vehicles. It relates particularly to vehicles of improved heat resistance which are especially adapted for use in pigmented coatings of the type which develop by suitable treatment a mottled, spattered, or grained appearance resembling hammered metal.

Finishes which simulate the appearance of hammered metal are well known in the art, but in the past have possessed scarcely more than the heat-resistance commonly associated with the usual organic coatings. Moreover, some of such coatings, in order to develop the desired hammered appearance require two or more separate coating operations. For industrial application of such finishes, such multiple-coat operations possess obvious disadvantages costwise. I have now discovered that durable heat-resistant finishes of hammered appearance can be prepared by cobodying styrenated and other vinylic alkyd resin(s) with certain siloxanol resins, and that such finishes are eminently suited for application to metals, etc. by a single coating operation followed by a single baking operation. The improved heat resistance makes the coatings especially useful on such apparatus as electric and gas space heaters, furnace jackets, automotive engine parts, and other metal parts subjected in use to moderate heat.

Accordingly, it is an object of this invention to provide a novel vehicle exhibiting heat-resistance and capable of being pigmented to yield durable coatings exhibiting a hammered appearance.

A further object is to provide a heat-resistant finish of hammered appearance which can be applied in a single coating operation followed by a single baking treatment.

These and other related objects will be apparent from the following detailed description of the invention.

I have discovered that fatty-acid modified alkyd resins and similar resins modified in the fatty acid portions thereof with styrene and/or other vinyl benzene compounds are or become compatible with the siloxanols described hereinafter when cobodied therewith. I have also discovered that by cobodying such materials together in proportions such that the siloxanols constitute from about 20% to about 80% by weight of the solids of the mixture, the resulting cobodied composition possesses those characteristics which cooperate with flake pigments to yield a hammered appearance in coatings made therefrom. Moreover, I have found that the cobodying of the siloxanols with the styrenated or other vinylic alkyd resins markedly improves the heat-resistance of the resulting composition in comparison with finishes of hammered appearance obtained from the corresponding alkyds alone.

Finishes of hammered appearance obtained from pigmented solutions of styrenated and like vinyl-modified alkyd resin are well known in the art, and I have found that my novel vehicles and coatings can be prepared from any of such known vinylic alkyd resins. Such resins have heretofore been modified with drying and/or semi-drying oils, or the acids of such oils, and for use in my vehicles and coatings should likewise be so modified. The "oil length" or fatty acid content equivalent thereto may vary widely; i. e., within the range of from "short oil lengths" to "long oil lengths." However, I prefer oil lengths between about 40% and 70%; that is, the weight of oil should be between about 40% and 70% of the total weight of the alkyd taken before styrene has been incorporated therein. When fatty acids are used, their amount should be equivalent to the above oil lengths. Furthermore, as indicated above, the kind of oil (e. g., linseed, castor, tung, fish, etc.) or the kinds of oil when used as mixtures in preparing the vinylic alkyd resins are of minor significance so long as they are either drying or semi-drying oils; hence, any oil of these latter classes can be used alone or any such oil can be mixed with any other oil(s) of the above classes of oils in preparing the oil-modified vinylic alkyd resins. I have also found that the amount of styrene, α-methyl styrene, vinyl toluene or other vinyl-substituted benzene in the alkyd resin may vary as widely as in the styrene-alkyd resins of known hammer finish coatings. However, I especially prefer to have the styrene or vinyl-substituted benzene content between about 40% and 60% of the total weight of the oil-modified vinylic alkyd resin, as such proportions give the most generally useful combinations of film properties. Those skilled in the art will recognize that where departures from such film properties or combinations of film properties are sought, the proportions of styrene (or other vinyl compound or mixtures of compounds) and oil (or equivalent fatty acids) may be varied as extensively as desired, or as extensively as necessary thereto. From the foregoing description of the vinylic alkyd resin, it will be understood that the present invention lays no claim to novelty in such vinylic alkyd resins per se and that the novelty is in the process and cobodied product of the invention wherein any of such vinylic alkyd resins are united chemically with a certain class of siloxanols.

Siloxanols suitable for use in the present invention are hydrolysis and partial condensation products of compositions which have the average general formula $R_nSiX_{4-n}$ where R represents phenyl and methyl radicals and X represents halogen, and where $n$ has a value of between about 1 and 1.7. Between 10 and 90 percent of the organic radicals represented by R should be phenyl radicals, and the remainder should be methyl radicals. A mixture of silanes which has the average composition represented above may be prepared from a plurality of silanes of the following types: silicon tetrachloride, phenyltrichlorosilane, methyltrichlorosilane, diphenyldichlorosilane, phenylmethyldichlorosilane, dimethyldichlorosilane, triphenylchlorosilane, diphenylmethylchlorosilane, phenyldimethylchlorosilane, trimethylchlorosilane. These monomers are employed in such relative proportions as to yield a mixture having the stated average composition and having the phenyl and methyl radicals within the stated relative range. Preferred silanes are those carrying either one or two organic radicals attached to each silicon atom.

When silanes and mixtures of silanes as specified above are hydrolyzed by reacting them with water in excess of the amount stoichiometrically necessary for hydrolysis, compositions result having hydroxyl groups bonded to silicon atoms. Moreover, during such hydrolysis a portion of those hydroxyls are condensed to give Si—O—Si linkages. By maintaining the temperature low during hydrolysis, such condensations can be held to a minimum. This results in products having a high percentage of hydroxyls. Contrarily, condensation is promoted by heating, and is accompanied by a reduction in the quantity of hydroxyls. Condensation of hydroxyls should not be permitted to proceed so far that the resin is no longer soluble in an aromatic hydrocarbon solvent such as xylene.

The siloxanols which are of utility in the present invention are those which contain at least 0.45% of hydroxyls by weight on the siloxanol resin, and not more than one hydroxyl per silicon atom; that is, not more than 20% of hydroxyls by weight.

Thus the siloxanols which are employed in the invention are characterized by having silicon atoms thereof bonded together by Si—O—Si linkages, the remaining valence bonds of those silicon atoms being satisfied by methyl, phenyl and hydroxyl radicals, the siloxanol containing an average total of between 1 and 1.7 methyl and phenyl radicals per silicon atom, of which total between 10% and 90% are phenyl radicals; the siloxanols also contain between 0.45% and 20% by weight of hydroxyl groups.

As indicated previously, the vehicles of the invention baking to hard, adherent, flexible films which exhibit good heat-resistance at temperatures of 400° F., and which possess excellent protective qualities even when applied on bare metal without a primer. Accordingly, the coatings are espacially useful for one-coat work.

The following examples illustrate a few of the many formulations which one skilled in the art may devise within the scope of the invention. Eighteen coatings are hereinafter tabulated for simplicity in presentation and consderation. Those coatings have been prepared from six different alkyd resins of low acid number having oil lengths of 40, 50 and 60% and having styrene contents of 40, 50 and 60%. The alkyds are designated A, B, C, D, E and F. Each of the six alkyds has been cobodied with 20%, 40% and 60% of siloxanol. The following chart illustrates the combinations which are embodied in the 18 different coatings, and shows the alkyd employed therein as well as the number of the example in which the preparation of the coating is described.

| | Example Number and Alkyd | | | | | | | | |
|---|---|---|---|---|---|---|---|---|---|
| | 60% siloxanol | | | 40% siloxanol | | | 20% siloxanol | | |
| Oil Length | 60% | 50% | 40% | 60% | 50% | 40% | 60% | 50% | 40% |
| Styrene, Percent: | | | | | | | | | |
| 60 | I-A | | | VII-A | | | XIII-A | | |
| 50 | II-B | III-C | | VIII-B | IX-C | | XIV-B | XV-C | |
| 40 | IV-D | V-E | VI-F | X-D | XI-E | XII-F | XVI-D | XVII-E | XVIII-F | are prepared by cobodying the vinylic fatty-acid-modified alkyd with the siloxanol. Such treatment is preferably conducted in an aromatic hydrocarbon solvent such as xylol or toluol. Xylol is preferred. The cobodying is conveniently carried out under reflux in a vessel fitted with a device whereby the solvent is returned to the vessel while the water which is liberated during the treatment is removed from the sphere of the reaction. The vessel is heated sufficiently to ensure refluxing of the solvent and azeotropic distillation of the water, and the treatment is generally continued until the mass is brought to a point just short of gelation.

The cobodied mass may, if desired, be thinned with additional solvent before being applied as a coating composition, with or without the addition of pigment. However, since the cobodied mass possesses the chemical and/or physical properties which permit the development of a hammered appearance in coatings made therefrom, it is desirable to pigment the mass with aluminum or other flaky pigment, such as "gold" bronze pigment or graphite, which enhance such appearance. Color pigments may be used along with flake pigment where colored hammer-finish coatings are desired. Where hammered appearance is sought, the flake pigment should be non-leafing. The amount of pigment may be varied considerably, but is usually at least 1% of flake pigment (by weight) where a hammered appearance is desired and preferably is not in excess of an amount which gives a pigment/vehicle-solids ratio of 3 to 8. Too large an amount of pigment may tend to conceal the hammered appearance of the coating, but will not otherwise impair the coating as a serviceable and durable protective film. It will be understood that the vehicle and coatings made therefrom are especially useful in providing protective films on metal, but can be applied to any other materials which are capable of withstanding the baking temperatures used in curing the wet coatings. The coatings are advantageously baked at about 350° F., but the temperature can be raised as the siloxanol content of the coating increases. Thus, where the siloxanol content is about 50% or more, temperatures of 400° F. or higher may be used conveniently.

Enamels made from the cobodied vehicles cure on

*Alkyd A*

This resin was prepared from a monoglyceride obtained by heating together the following ingredients:

```
                                              Grams
Linseed oil _____ 450
Dehydrated castor oil _____ 450
Glycerine (99.7%) _____ 185
                                              ____
   Total _____ 1085
```

The monoglyceride weighing 1085 g. was mixed with 408 g. phthalic anhydride, 10 g. glycerine, 8 g. ditertiary butylperoxide, 2270 g. styrene, and 183 g. xylol, and the whole mixture was heated under reflux conditions over a period of 4¾ hours to a final temperature of 185° C. The resulting resin had a cure time of 45 seconds at 200° C., and a viscosity of W-X. 8 ml. of water was collected. The resin was finally reduced with 1780 g. xylol.

*Alkyd B*

This resin was prepared from a monoglyceride identical with the one used in Alkyd A, by mixing 1085 g. of the monoglyceride with 404 g. phthalic anhydride, 10 g. glycerine, 8 g. ditertiary butylperoxide, 1500 g. styrene, and 120 g. xylol. The mixture was refluxed for 8 hours to a final temperature of 198° C. and a cure time of 42 seconds at 200° C. The viscosity was U-V and 17 ml. of water was collected. The resin was finally reduced with 1498 g. xylol.

*Alkyd C*

This resin was prepared from a monoglyceride obtained by heating:

```
                                              Grams
Linsed oil _____ 300
Dehydrated castor oil _____ 300
Glycerine (99.7%) _____ 185
                                              ____
   Total _____ 785
```

785 g. of the monoglyceride was mixed with 405 g. phthalic anhydride, 10 g. glycerine, 8 g. ditertiarybutyl peroxide, 1200 g. styrene, and 120 g. xylol. The whole mixture was refluxed for 7 hours 15 minutes to a final temperature of 185° C. and a cure time of 40 seconds at 200° C. The viscosity was V–W and 13 ml. of water was collected. The resin was finally reduced with 1172 g. xylol.

*Alkyd D*

This resin was prepared from a monoglyceride identical with the one used in Alkyd A by mixing 1085 g. of the monoglyceride with 404 g. phthalic anhydride, 10.5 g. glycerine, 6 g. ditertiary butylperoxide, 1000 g. styrene and 90 g. xylol. The whole mixture was refluxed for 5 hours 45 minutes to a final temperature of about 205° C. and a cure time of 43 seconds at 200° C. The viscosity was R. The resin was finally diluted with 1090 g. xylol.

*Alkyd E*

This resin was prepared from a monoglyceride identical with the one used in Alkyd C by mixing 785 g. of the monoglyceride with 405 g. phthalic anhydride, 10 g. glycerine, 8 g. ditertiary butylperoxide, 800 g. styrene, and 120 g. xylol. The whole mixture was refluxed 13 hours 45 minutes to a maximum temperature of 192° C. and a cure time of 42 seconds at 200° C. The viscosity was U–V and 22 ml. of water was collected. The resin was then reduced with 1030 g. xylol.

*Alkyd F*

This resin was prepared from a monoglyceride obtained by heating:

|   | Grams |
|---|---|
| Linseed oil | 200 |
| Dehydrated castor oil | 200 |
| Glycerine (99.7%) | 185 |
| Total | 585 |

The 585 g. of monoglyceride was mixed with 405 g. phthalic anhydride, 10 g. glycerine, 4 g. ditertiarybutylperoxide, 670 g. styrene and 60 g. xylol. The whole mass was refluxed for 4 hours 20 minutes to a maximum temperature of 190° C., and a viscosity of V–W. 36 ml. of water was collected. The resin was finally reduced with 839 g. xylol. The cure time of the foregoing resins was determined on a commercial cure plate made by the Thermoelectric Company, Cleveland, Ohio.

The various coatings of the examples were prepared from the foregoing alkyds by cobodying them with various proportions of a polysiloxanol solution containing 70 parts of the polysiloxanol solids in 30 parts of xylol.

The siloxanol was prepared from an equal molar mixture of phenyl trichlorosilane, methyl trichlorosilane and methylphenyldichlorosilane so as to produce a product having a total of 1.33 methyl plus phenyl radicals per silicon atom, and equal numbers of methyl and phenyl radicals. This mixture of silanes was hydrolyzed by adding it with agitation to a mixture of water and toluol. The amount of water was sufficiently in excess of that required for hydrolysis to dissolve all of the hydrogen chloride liberated by the hydrolysis and to give a 20% aqueous hydrochloric acid solution as a result thereof. The toluol was employed in such amount as to yield a 35% by weight solution of the siloxanol resin in the toluol. Upon completion of the hydrolysis, the resin was transferred to xylol by adding enough xylol to produce a 70% xylol solution of the resin, and then removing the toluol by vacuum distillation. The siloxanol had an hydroxyl content of 3.61% by weight of resin solids.

The alkyd and the siloxanol solution were refluxed in a kettle equipped with a device for azeotropic distillation, for separation of water and return of xylol to the kettle. Table I gives the proportions of alkyd and siloxanol solids, the refluxing time involved in each example, the maximum temperatures attained, amount of water collected, and various other data. The cobodied materials were subsequently reduced with xylol, pigmented with substantially 3.2% of non-leafing aluminum pigment, and then were sprayed on metal panels and baked ½ hour at 350° F. Table II gives illustrative results obtained on heat tests of 16 hours at 400° F. The gloss of the various coated samples was measured with a Gardner glossmeter before and after the heat test, with the results shown in the tables. All of the coatings shown in Table II retained their color very well; that is, the heat test caused little discoloration although causing the indicated reduction in gloss.

TABLE I

| Example | Alkyd | Siloxanol | Cooking Data | | | Cobodied Product | | | |
|---|---|---|---|---|---|---|---|---|---|
| | | | Hours | Temp., °C. | H₂O (ml.) | Color | Visc. | A. N. | NVM |
| | | Parts* | Parts* | | | | | | | |
| I | A | 40 | 60 | 12 | 141–150 | 4 | 2–3 | M–N | 5.4 | 49.8 |
| II | B | 40 | 60 | 11.5 | 145–149 | 2.9 | 3–4 | M–N | 5.3 | 48.8 |
| III | C | 40 | 60 | 7.5 | 142–150 | 3.5 | 4–5 | M–N | 8.7 | 48.6 |
| IV | D | 40 | 60 | 11 | 151–167 | 4 | 4–5 | N–O | 3.0 | 50.4 |
| V | E | 40 | 60 | 4 | 150–157 | 2.5 | | | | |
| VI | F | 40 | 60 | 6 | 140–150 | 3 | 3 | V+ | 7.0 | 49.1 |
| VII | A | 60 | 40 | 9 | 144–147 | 4 | 3 | J | 7.7 | 47.4 |
| VIII | B | 60 | 40 | 11 | 144–155 | 4 | 4–5 | S–T | 7.4 | 51.5 |
| IX | C | 60 | 40 | 5 | 140–150 | 3 | 5–6 | L–M | 12.9 | 48.5 |
| X | D | 60 | 40 | 9 | 144–156 | 2.5 | 4–5 | Q–R | 4.2 | 50.6 |
| XI | E | 60 | 40 | 2.5 | 150–151 | 2.5 | | | | |
| XII | F | 60 | 40 | 9 | 144–151 | 4 | 2–3 | Q–R | 3.9 | 46.8 |
| XIII | A | 80 | 20 | 15 | 147–154 | 3 | 3–4 | O–P | 9.3 | 51.6 |
| XIV | B | 80 | 20 | 16 | 145–152 | 2 | 4–5 | T–U | 8.9 | 50.7 |
| XV | C | 80 | 20 | 11 | 142–155 | 2 | 6–7 | T–U | 16.3 | 50.1 |
| XVI | D | 80 | 20 | 13 | 150–161 | 3 | 5–6 | T–U | 4.7 | 49.2 |
| XVII | E | 80 | 20 | 24 | 143–146 | 1.5 | 4–5 | R–S | 0.8 | 50.2 |
| XVIII | F | 80 | 20 | 13 | 146–150 | 2 | 3 | T–U | 5.2 | 47.4 |

*Parts by weight of solids only.

TABLE II

| Example | Gloss | |
|---|---|---|
| | Initial | After Heat-test |
| I | 83 | 67 |
| VI | 76 | 62 |
| VII | 88 | 75 |
| XVII | 90 | 66 |
| XVIII | 89 | 67 |

Example XIX

An alkyd resin was prepared from the following ingredients:

| | Grams |
|---|---|
| Dehydrated castor oil | 700 |
| Glycerine | 101 |
| Phthalic anhydride | 232 |
| Litharge catalyst | ¼ |

The oil, glycerine and catalyst were heated to about 450° F. to prepare a monoglyceride. The phthalic anhydride was then added and the whole mass was heated to about 500° F., and held until an acid number of approximately 24 had been secured. The resulting alkyd resin was then mixed with the following ingredients in the proportions stated:

| | Grams |
|---|---|
| Alkyd resin (above) | 1000 |
| α-Methyl styrene | 488 |
| Styrene | 732 |
| Peroxide catalyst | 12.2 |

The whole mass was heated with occasional introduction of sufficient xylol to attain a final reflux temperature of between 340° F. and 370° F.; the whole mass was then held under reflux with separation of liberated water until a sample of the mass when reduced to 50% solids in xylol had a viscosity of S on the Gardner-Holdt scale.

The resulting resin was then cobodied with a xylol solution of the polysiloxanol of the previous examples in the manner and proportions already described above, to prepare vehicles which after being pigmented with flake aluminum could be sprayed on metal and cured to finishes exhibiting a hammered appearance.

From the foregoing description of the invention, it will be clear that the principles of the invention embrace many variations beyond those illustrated by the examples. As stated above, any fatty-acid-modified alkyd may be employed when modified with styrene or other vinyl compound(s). Thus a wide variety of dicarboxylic acids can be used individually or in admixtures in preparing the alkyd. Likewise many different polyhydric alcohols or mixtures of polyhydric alcohols can be used. Also as indicated, many different drying or semi-drying oils or their acids can be employed. Moreover, while the examples show introduction of the styrene or the mixture of styrene with α-methyl styrene directly into the reaction mass, it will be obvious to those skilled in the art that the oils used in the alkyds may be modified with styrene or other vinyl benzenes of up to 9 carbons in advance of the preparation of the alkyd, or that, for example, styrene per se can be added together with styrenated oil. While it is commercially desirable to prepare the alkyds from oils, those skilled in the art recognize that the alkyds can be prepared instead from the acids of drying or semi-drying oils. All of these variations and many others are so well known in the art that exemplification of them seems unnecessary.

The cobodied resins described hereinabove may also be blended with other film-forming materials which are soluble in and compatible with the solutions of cobodied alkyd and siloxanol where particular modifications in film properties and/or characteristics are desired. Thus melamine-formaldehyde resins, urea-formaldehyde resins, various alkyd resins, drying and/or semi-drying oils, etc. may be included in the vehicles of the coating compositions. Dryers and other common adjuvants may also be included.

Having described the invention, what is claimed is:

1. The process of preparing a coating vehicle capable of being suitably pigmented, applied as a film and then cured to produce a cured coating having an appearance simulating hammered metal, said process comprising: providing an alkyd resin (A) which is free of non-benzenoid unsaturation between carbons in the polycarboxylic acid and polyhydric alcohol radicals thereof, (B) which has been modified molecularly with fatty acids of at least one glyceride oil selected from the class consisting of drying and semi-drying oils, the amount of fatty acids being equivalent to an oil content of between about 40% and 70% by weight of the modified alkyd, (C) which has been modified in its fatty acid portions to an extent of from about 40% to 60% by weight of the fatty acid modified alkyd resin with at least one compound selected from the group consisting of styrene, α-methyl styrene and vinyl toluene, and (D) which is soluble in aromatic hydrocarbon solvent; and cobodying one part by weight of said alkyd resin with from ¼ to 4 parts by weight of a siloxanol which is characterized (1) by having its silicon atoms bonded together by Si—O—Si linkages, (2) by having the remaining valences of its silicon atoms satisfied by methyl, phenyl and hydroxyl groups, (3) by having an average total of between about 1 and 1.7 methyl and phenyl groups per silicon atom, of which average total between 10% and 90% are phenyl radicals, (4) by having an hydroxyl content of between about 0.45% and 20% by weight of the siloxanol solids, and (5) by being soluble in aromatic hydrocarbon solvent, said cobodying being effected under reflux conditions in the presence of aromatic hydrocarbon solvent with removal of water liberated during said cobodying treatment until a substantial increase in viscosity short of gelation has been secured.

2. The process as claimed in claim 1 wherein said cobodying treatment is carried out in xylene to a viscosity of at least J on the Gardner-Holdt scale when the solids content is about 50%.

3. The process as claimed in claim 1 wherein the weight ratio of siloxanol to modified alkyd in the mixture which is to be cobodied is between about ¼ and 1½ to 1.

4. The process as claimed in claim 3 wherein the siloxanol contains about an equal number of methyl and phenyl groups and the total of said groups averages about 1.33 per silicon atom.

5. The process as claimed in claim 4 which includes pigmenting said vehicle with about 1%–3.2% of non-leafing metallic flake pigment.

6. A coating composition particularly adapted to yield baked films having an appearance simulating hammered metal and adapted to endure prolonged service at moderately elevated temperatures, said composition comprising a vehicle composed essentially of an aromatic hydrocarbon solvent solution of a cobodied inter-reaction product of (A) between 20 and 80 parts of an alkyd resin (1) which is free of non-benzenoid unsaturation between carbons in the polycarboxylic acid and polyhydric alcohol radicals thereof, (2) which has been modified molecularly with fatty acids of at least one glyceride oil selected from the class consisting of drying and semi-drying oils, the amount of fatty acids being equivalent to an oil content of between about 40% and 70% by weight of the modified alkyd resin, and (3) which has been modified in its fatty acid portions with at least one compound selected from the group consisting of styrene, α-methyl styrene and vinyl toluene in an amount between about 40% and 60% by weight of the fatty acid modified alkyd resin with (B) between 80 and 20 parts of a siloxanol which is characterized (1) by having its silicon atoms bonded together by Si—O—Si linkages, (2) by having the remaining valences of its silicon atoms satisfied by methyl, phenyl and hydroxyl groups, (3) by having an average total of between about 1 and 1.7 methyl and phenyl groups per silicon atom with between 10% and 90% of the total phenyl and methyl groups being phenyl groups, (4) by having an hydroxyl content of between about 0.45% and 20% by weight of the siloxanol solids, and (5) by being soluble in aromatic hydrocarbon solvent, said inter-reaction product having been produced by cobodying the alkyd resin with said siloxanol under reflux conditions in an aromatic hydrocarbon solvent with removal of liberated water of reaction until a substantial increase in viscosity short of gelation had been secured.

7. A coating composition as claimed in claim 6 wherein said cobodied inter-reaction product has a viscosity of at least J on the Gardner-Holdt scale when the solids content is about 50%.

8. A coating composition as claimed in claim 6 wherein the weight ratio of siloxanol to modified alkyd resin prior to cobodying is between about ¼ and 1½ to 1.

9. A coating composition as claimed in claim 8 wherein the siloxanol contains about an equal number of methyl and phenyl groups and the total said groups averages about 1.33 per silicon atom.

10. A coating composition as claimed in claim 9 wherein said cobodied inter-reaction product has a viscosity of at least J on the Gardner-Holdt scale when the solids content is about 50%.

11. A coating composition as claimed in claim 10 which is pigmented solely with 1%–3.2% of non-leafing metallic flake pigment.

References Cited in the file of this patent

UNITED STATES PATENTS

| | | |
|---|---|---|
| 2,258,222 | Rochow | Oct. 7, 1941 |
| 2,392,710 | Wakeford et al. | Jan. 8, 1946 |
| 2,491,409 | Kropa et al. | Dec. 13, 1949 |
| 2,539,438 | Kropa et al. | Jan. 30, 1951 |
| 2,574,659 | Prislin | Nov. 13, 1951 |
| 2,587,295 | Doyle | Feb. 26, 1952 |
| 2,607,755 | Bunnell | Aug. 19, 1952 |

FOREIGN PATENTS

| | | |
|---|---|---|
| 583,754 | Great Britain | Dec. 30, 1946 |

OTHER REFERENCES

Rochow: An Introduction to the Chemistry of the Silicones, 2nd edition, page 68, published by Wiley, New York (1951).